(12) United States Patent
Houle

(10) Patent No.: US 7,540,696 B1
(45) Date of Patent: Jun. 2, 2009

(54) SPOT DRILLING INSERT

(75) Inventor: Jacques H. Houle, Bristol, CT (US)

(73) Assignee: Century Tool & Design, Inc., Milldale, CT (US)

( * ) Notice: Subject to any disclaimer, the term of this patent is extended or adjusted under 35 U.S.C. 154(b) by 816 days.

(21) Appl. No.: 10/758,367

(22) Filed: Jan. 15, 2004

(51) Int. Cl.
*B23B 13/00* (2006.01)

(52) U.S. Cl. .................. 408/211; 408/213; 408/225; 408/713

(58) Field of Classification Search ......... 408/211–213, 408/223–225, 231, 233, 713; 82/124, 127, 82/142, 150, 170, 903; *B23B 13/00*
See application file for complete search history.

(56) References Cited

U.S. PATENT DOCUMENTS

| | | | | |
|---|---|---|---|---|
| 3,288,015 A | * | 11/1966 | Hanneman | 411/387.4 |
| 3,395,603 A | * | 8/1968 | Skierski | 411/387.8 |
| 3,564,948 A | * | 2/1971 | Pomernacki | 408/211 |
| 4,147,088 A | * | 4/1979 | Whittaker, Jr. | 411/387.8 |
| 4,286,904 A | * | 9/1981 | Porter et al. | 408/225 |
| 4,565,473 A | | 1/1986 | Hosoi | 408/229 |
| 4,708,557 A | * | 11/1987 | Hashimoto | 411/387.8 |
| 4,787,792 A | * | 11/1988 | Jesson et al. | 411/387.7 |
| 4,968,193 A | * | 11/1990 | Chaconas et al. | 408/211 |
| 5,112,167 A | | 5/1992 | Shiga et al. | 408/211 |
| 5,149,234 A | * | 9/1992 | Durfee, Jr. | 408/211 |
| 5,286,143 A | * | 2/1994 | Schimke | 408/211 |
| 5,288,183 A | * | 2/1994 | Chaconas et al. | 408/211 |
| 5,779,403 A | * | 7/1998 | Kleine et al. | 408/230 |
| 5,827,019 A | | 10/1998 | Morrissey | 408/227 |
| 6,095,723 A | | 8/2000 | Reynolds et al. | 407/54 |
| 6,129,162 A | * | 10/2000 | Hauptmann | 175/394 |
| 6,227,774 B1 | * | 5/2001 | Haughton et al. | 408/225 |
| 6,260,637 B1 | * | 7/2001 | Haussmann et al. | 175/420.1 |
| 6,312,432 B1 | * | 11/2001 | Leppelmeier | 606/80 |
| 6,371,702 B1 | * | 4/2002 | DeWald et al. | 408/227 |
| 6,446,741 B1 | * | 9/2002 | Kersten et al. | 175/428 |
| 6,565,296 B2 | * | 5/2003 | McKinley et al. | 408/224 |
| 6,629,805 B1 | * | 10/2003 | Eischeid | 408/228 |
| 6,641,395 B2 | | 11/2003 | Kumar et al. | 433/165 |
| 6,702,047 B2 | * | 3/2004 | Huber | 175/427 |
| 6,848,869 B2 | * | 2/2005 | Stokey | 408/227 |

(Continued)

FOREIGN PATENT DOCUMENTS

JP 2006088267 A * 4/2006

*Primary Examiner*—Boyer D Ashley
*Assistant Examiner*—Sara Addisu
(74) *Attorney, Agent, or Firm*—Alix, Yale & Ristas, LLP

(57) ABSTRACT

A spot drilling tool includes a drill holder and an insert removably mounted to the holder. The insert is a standardized part configured to support a drill point in a predetermined position forward of the drill holder and centered on the rotational axis of the drill holder. The drill point has two flutes and two substantially conical land surfaces extending between the flutes. The land surfaces have centers of curvature offset from the rotational axis of the insert to provide radial clearance for the trailing portion of the land. A chisel edge at the tip of the drill point is supported by a tapered web defined between the diagonally opposed and offset flutes. Linear cutting edges are formed at the junction of a planar flute surface and the conical land surface. The cutting edges define a narrow included point angle of between 50° and 80°.

16 Claims, 4 Drawing Sheets

U.S. PATENT DOCUMENTS 7,147,414 B2 * 12/2006 Mast et al. ................. 408/225
2003/0077134 A1 * 4/2003 Moser et al. ............... 408/231
2004/0001741 A1 * 1/2004 Mast et al. ................. 408/233
2004/0151553 A1 * 8/2004 George et al. .............. 408/230

* cited by examiner

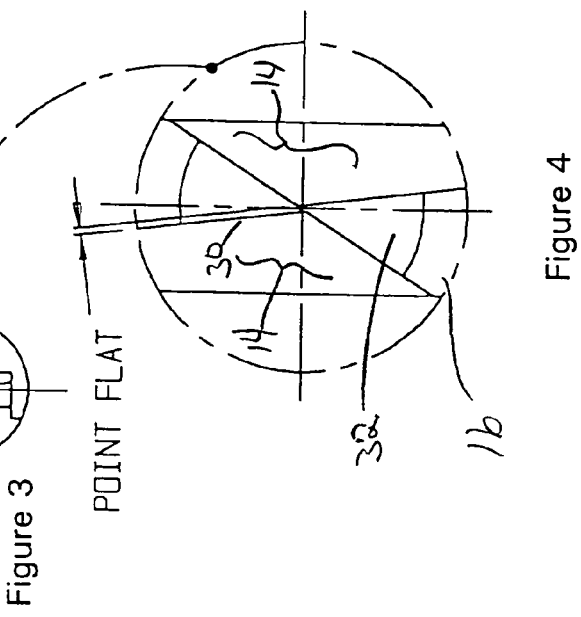
Figure 3
Figure 4
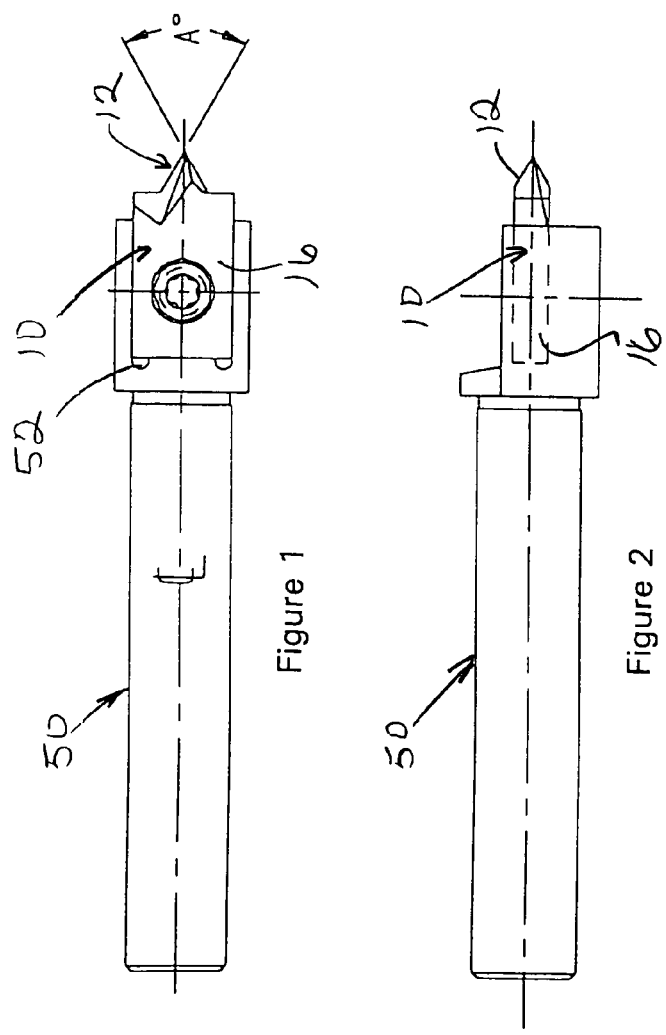
Figure 1
Figure 2

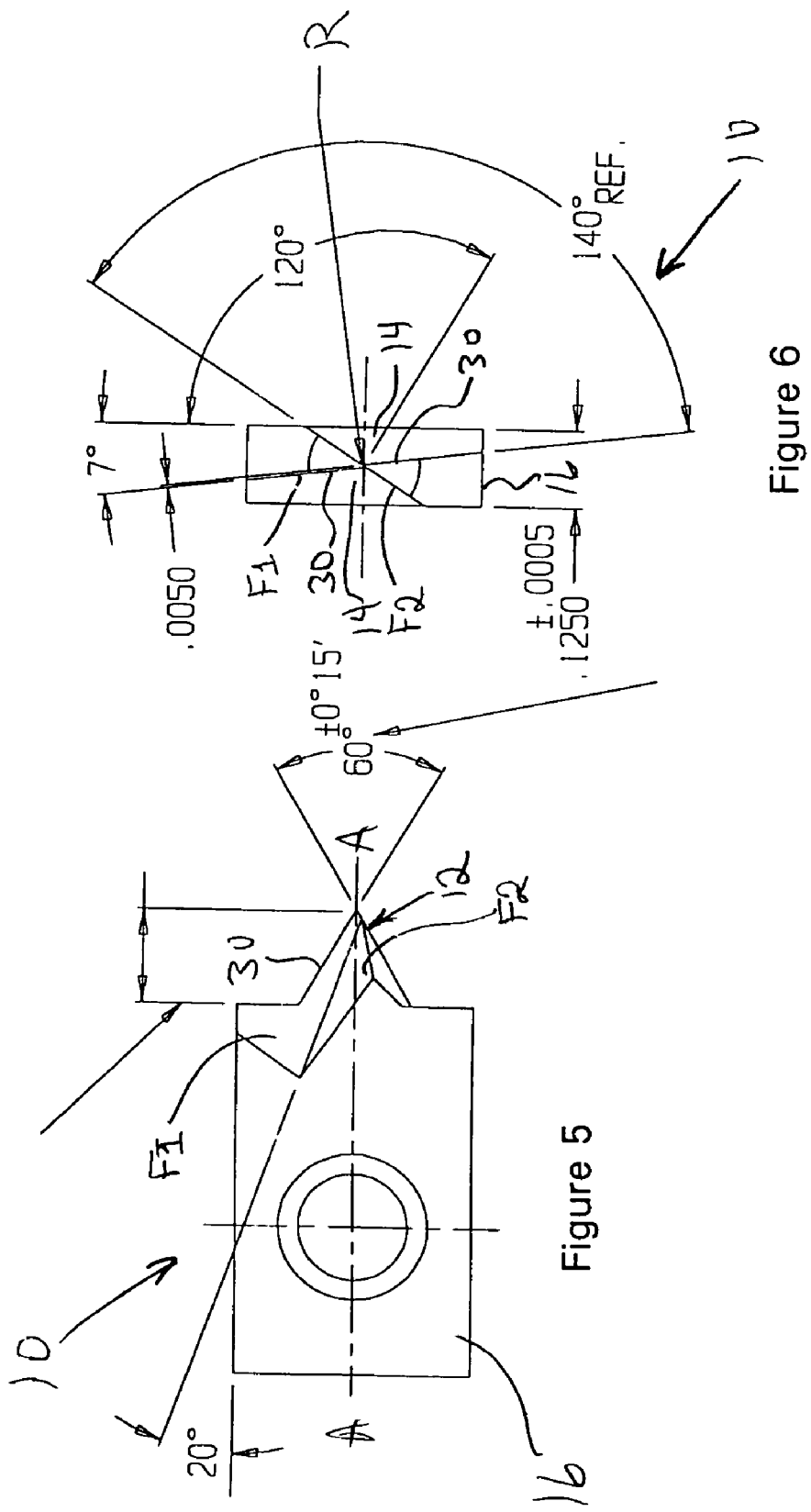

SPOT DRILLING INSERT

FIELD OF THE INVENTION

The present invention generally relates to the field of cutting tools and more particularly to a spotting drill insert with improved point geometry.

DESCRIPTION OF THE RELATED ART

Hole making is the most common machining process, consuming 50 to 70 percent of all production time. Differences in material, hole diameter, depth, location and surface finish make each hole making operation unique. The selection of the proper machine tool, cutting tool, point geometry, feed rate, cutting speed and feed force have a significant impact on the efficiency of the hole making operation and the quality of the resulting holes. Drilling holes with a diameter of less than 0.010 inches, sometimes called "micro drilling", is a particularly demanding type of hole making. The tiny drills used to make these holes require an accurately placed and configured spot or pilot hole to position the drill point on the workpiece so it won't walk. The pilot hole also acts as a guide for the drill during the initial stage of drilling. Setting the drill on a straight path is an important factor in the accuracy of the resulting hole.

Spot drilling is the process of forming the pilot hole or "spot" for a subsequent drilling operation. Spot drilling in preparation for micro drilling requires a spot with steeply angled side walls that will accurately center the drill and provide directional stability during the initial stage of drilling. The most common types of drills employed in spot drilling are twist drills and spade drills. Twist drills are rotary end-cutting tools having one or more cutting lips and one or more helical flutes for the passage of chips and cutting fluids. The included angle defined between the cutting lips of a twist drill is called the point angle. The standard point angle for a twisted drill is 118°, with smaller angles available for drilling softer materials such as magnesium, aluminum or plastic. As with any cutting tool, the cutting surfaces of a drill wear with use and must be renewed to ensure acceptable quality of the finished product. When worn, a twist drill must be removed from the drilling machine and sharpened or replaced. Removing the twist drill often requires a time consuming re-calibration of the machine tool.

Spade drills are alternative rotary end cutting tools in which a tool holder defines a socket for rigidly supporting a replaceable cutting insert. The cutting edges are ground on the insert. A major advantage of spade drills is that the cutting insert can be replaced quickly, minimizing machine downtime and reducing the cost of maintaining a sharp cutting edge. The tool holder, socket and mounting screws for the insert are configured to precisely and repeatably position the insert. Replacement of the insert can frequently be accomplished without re-calibrating the drilling machine.

As with all metal cutting edges, the cutting surfaces of a drill must be provided with a relief clearance. The purpose of relief clearance is to avoid interference and rubbing between the workpiece and trailing surfaces of the cutting tool. Relief clearance is typically provided by removing material behind the cutting edges of the drill point and is quantified in terms of a relief angle measured in degrees of clearance. In general, as the drill point angle decreases, the relief angle required for adequate clearance increases. A common procedure is to grind the tool surface behind the cutting edge into one or more facets to provide the necessary clearance. Twist drills may employ conical relief surfaces ground by rotating the drill about its axis relative to a grinding wheel. Spade drill inserts are frequently provided with angular relief surfaces.

As previously discussed, very small diameter drills function best when provided with a pilot that centers and guides the drill. Pilots formed by drills having point angles in excess of 100° may not have sufficient centering and guidance for very small diameter drills. As the point angle of the pilot forming drill is reduced to provide a more steeply tapered spot, the increased relief angle eventually weakens the cutting edges to an extent that the drill is no longer durable. There is a need in the art for a durable spot drilling tool having a point angle of less than 90° for the preparation of pilot holes for drills having a diameter of 0.006 inches or greater.

SUMMARY OF THE INVENTION

Briefly stated, the present invention comprises a new and improved point geometry for a spot drilling insert. An illustrated embodiment of the spot drilling insert has two cutting edges at a point angle of approximately 60° supported on a substantially conical drill point. The cutting edges are diametrically opposed and offset from each other. A chisel edge having a length of approximately 0.005 inches extends between the radially inward ends of the cutting edges. Angled linear flutes are defined by the intersection of substantially planar first and second flute surfaces. The intersection of the first and second flute surfaces is configured as a radius to promote chip curling and movement. The flutes converge toward the tip of the drill point. Conical land surfaces define the periphery of the drill point between the two flutes.

An aspect of the invention relates to conical land surfaces with an axis of curvature offset from the rotational axis of the drill point. The conical land surface intersects the first flute surface to define a substantially linear cutting edge. A trailing edge of the drill point is defined at the intersection of the conical land surface with the second flute surface of the second flute. Because of its offset axis of curvature, the conical land surface is closer to the rotational axis of the drill point at the trailing edge of the land. This reduced radial distance provides relief clearance for each cutting edge. The offset axis of curvature of the conical land surface is parallel to the rotational axis of the drill point so that the relief remains constant along the length of each cutting edge.

A conical relief surface leaves more tool material behind the cutting edge than is possible with angular relief. The conical land surface permits manufacture of a narrow point angle, small diameter spot drilling point with adequate clearance and a robust cutting edge not possible with prior art drill point geometries.

It is an object of the present invention to provide a new and improved spot drilling point geometry.

Another object of the present invention is to provide a new and improved spot drilling point geometry for pilot drilling in fine-gauge materials.

A further object of the present invention is to provide a new and improved method for manufacturing a drill point.

A still further object of the present invention is to provide a new and improved drill point geometry useful for drilling pilot holes for subsequent very small diameter drilling operations.

BRIEF DESCRIPTION OF THE DRAWINGS

These and other objects, features and advantages of the invention will become readily apparent to those skilled in the art upon reading the description of the preferred embodiments, in conjunction with the accompanying drawings in which:

FIG. 1 is a front view of a spot drilling insert according to aspects of the present invention in a tool holder;

FIG. 2 is a side view, partially in phantom, of the spot drilling insert and tool holder of FIG. 1;

FIG. 3 is a right end view of the spot drilling insert and tool holder of FIG. 1;

FIG. 4 is a partial enlarged view of the spot drilling insert and tool holder of FIG. 3;

FIG. 5 is an enlarged isolated front view of a spot drilling insert according to aspects of the present invention;

FIG. 6 is a right end view of the spot drilling insert of FIG. 5;

DETAILED DESCRIPTION OF THE PREFERRED EMBODIMENT

With reference to the drawings, wherein like numerals indicate like parts throughout the several figures, a spot drilling insert exemplary of aspects of the present invention is generally designated by the numeral 10. FIGS. 1-3 illustrate a drill holder 50 in conjunction with a spot drilling insert 10 according to aspects of the present invention. The drill holder 50 defines a socket that is configured to receive and secure the spot drilling insert. The insert 10 includes a tapered mounting hole that receives a mounting screw having a complementary taper. The tapered hole and screw ensure contact between mounting surfaces of the insert and the bottom and rear surfaces of the socket to consistently position the insert 10 relative to the holder 50. The rear, side and bottom mounting faces of the insert 10 are ground to very close tolerances so that exchanging one spot drilling insert for another positions the drill point of the new insert substantially in the same location as the drilling point of the insert being replaced. This permits a fast and efficient renewal of the drill point cutting edges without adjustment or calibration of the machine tool carrying out the spot drilling operation.

Figure 7:
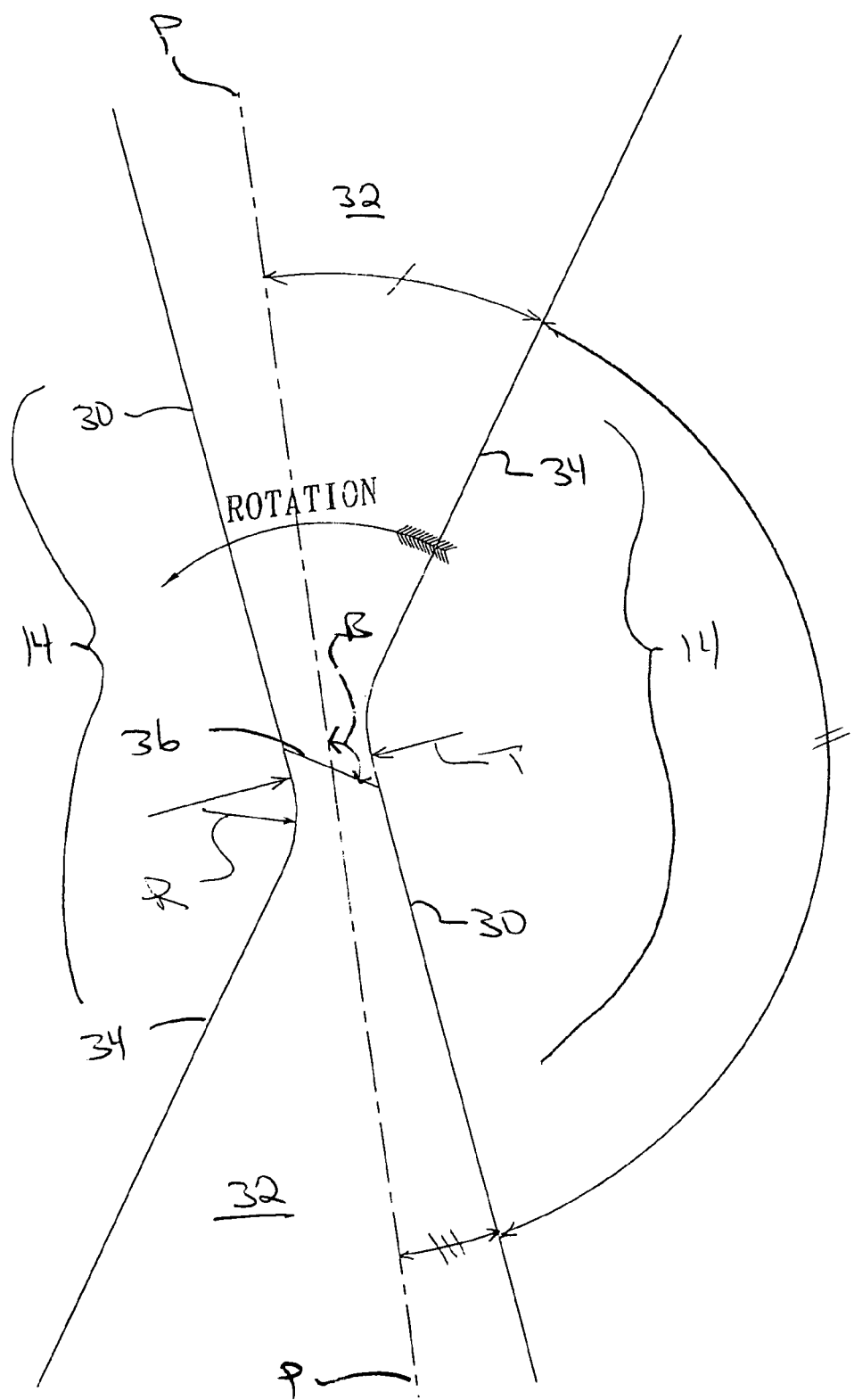
FIG. 7 is a greatly enlarged partial end view of a spot drilling insert according to aspects of the present invention.

An exemplary embodiment of the inventive spot drilling insert 10 is illustrated in FIGS. 5 and 6. The substantially conical drill point 12 supports two cutting edges 30 at an included angle of 60°. Two offset flutes 14 and two conical land surfaces 32 extending between the flutes define the drill point 12. Each side of the drill point is a mirror image of the other, resulting in a rotationally symmetrical cutting tool. The flutes 14 are offset as best shown in FIG. 6 and angled to converge toward the tip of the drill point 12. Each flute 14 is substantially linear and includes first and second substantially planar flute surfaces F1, F2 meeting at a radius R. Each cutting edge 30 is formed at the intersection of a first flute surface F1 with the conical land surface 32. The flute surface F1 is substantially planar and the land surface 32 is conical, resulting in a linear cutting edge 30. The first flute surfaces F1 are parallel to each other but diametrically offset by a distance T to leave a web connecting the lands and supporting a chisel point 36. A chisel point 36 extends between the radially inner ends of the cutting edges 30. In the illustrated embodiment, the offset T is approximately 0.005 inches. The flutes diverge from each other at an angle of approximately 24° as they progress away from the chisel edge so that the web connecting the opposite sides of the drill point 12 is thickest at the intersection of the drill point 12 with the insert body 16 at the base of the drill point. A thin web at the tip of the drill point 12 supports a short chisel edge 36 with a small negative rake angle. The chisel edge 36 is oriented at an angle B of approximately 120° relative to a plane bisecting the drill tip 12 as shown in FIGS. 6 and 7. A chisel edge 36 of short length, angled orientation and relatively small negative rake angle combine to reduce the feed force necessary for the inventive drill point geometry to penetrate the material being drilled.

The first and second flute surfaces F1, F2 define an obtuse included angle of approximately 140°. With reference to FIG. 5, the radius R at the junction of the two flute surfaces is oriented at an angle of approximately 20° with respect to the rotational axis A of the insert. The flutes 14 and their associated cutting and trailing edges 30, 34 cross (overlap angularly) beneath the chisel edge 36 as shown in FIG. 7. This results in a twisted drill point configuration that cuts in a clockwise direction of rotation also referred to as a right hand drill point. With reference to FIG. 6, the flutes are cut so that the first flute surfaces F1 are oriented at an angle of approximately 7° relative to the front and rear faces of the insert body. This angular orientation ensures a small positive rake angle for the face of the cutting edge 30 (first flute surface F1). During drilling, chips of the material being drilled form on the flute surface F1 and are guided by the flute radius R and second flute surface F2 away from the drill point 12. The flutes 14 provide a path for chip flow away from the drill point 12 and cutting fluids toward the cutting edges 30 and chisel point 36.

Manufacture of a spotting drill insert according to aspects of the present invention begins with a rectangular slab of micro-grain tungsten carbide. The slab is provided with a tapered mounting hole that will eventually receive the complementary mounting screw. The bottom, side, front and rear faces of the slab are precision ground to a particular rectangular configuration relative to the mounting hole. The calibrated carbide slab forms the rectangular insert body 16. The flute surfaces F1, F2 and the radius R at their junction are then ground, extending off one end of the insert body 12. Each flute surface comprises two substantially planar surfaces F1, F2 meeting at an angle of 140°. The radius R at the junction of the two flute surfaces is between five and ten thousandths of an inch (0.005-0.010). As best seen in FIGS. 4 and 7, flute surfaces F1 are diametrically offset approximately five thousandths of an inch (0.005) at the tip of the drill point, e.g., each flute surface F1 is offset from a center plane P of the insert body approximately 0.0025 inches beneath the chisel edge 36. This leaves a web between the diametrically opposite portions of the drill point to support the chisel edge 36. Flute surface F1 is angled at 7° relative to a center plane P of the insert body. Flute surfaces F1 and F2 are ground so that the radius R at their junction is oriented at an angle of 20° relative to a longitudinal center line of the insert body as shown in FIG. 5. The angled and divergent configuration of the flutes 14 promotes chip movement away from the cutting edge 30 and the chisel edge 36.

An aspect of the invention relates to providing the spotting drill insert with a hard coating of titanium nitride (TiN) or titanium aluminum nitride (TiAlN). Such coatings are known in the art to enhance the hardness and abrasion resistance of tool cutting surfaces. It has been observed that the thickness of the hard coating, though small, will define a radius covering a pre-ground cutting edge. This radius dulls the cutting edge, necessitating increased energy input for a given cutting operation which results in increased heat and reduced tool life. In the context of the present invention the hard coating is applied after grinding the flutes 14 and prior to a final grinding step which provides the cutting edge 30. Grinding the cutting edge after hard coating leaves the hard coating on the working face (flute surface F1) of the tool without covering the cutting edge 30. This manufacturing sequence provides a clean, sharp cutting edge adjacent a hard, abrasion resistant chip forming face. Tool life is extended without impairing cutting performance.

Figure 8:
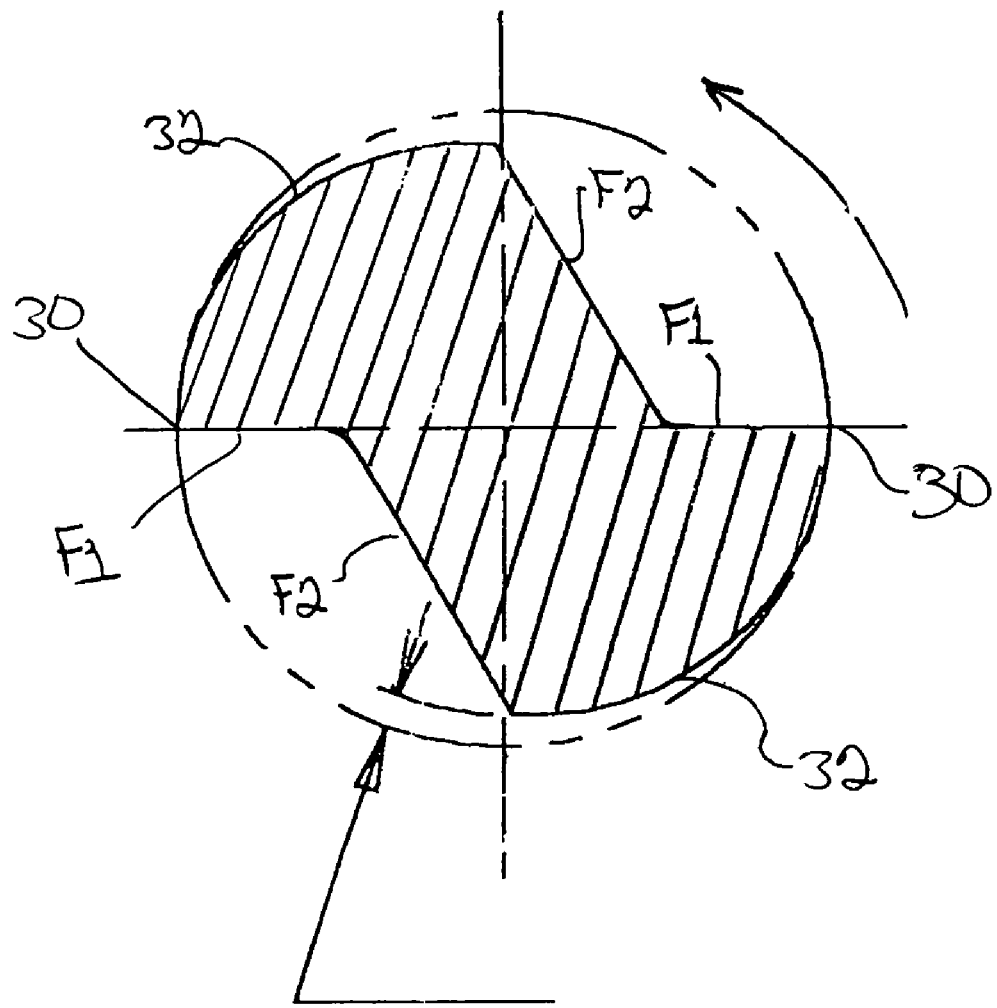
FIG. 8 is a schematic sectional representation through a drilling point having a geometry according to aspects of the present invention.

After coating, the offset conical land surfaces 32 are ground to shape the drill point 12. The coated insert with its pre-ground flutes 14 is installed in a swing jig at an angle calculated to produce center cutting edges 30 at the finished included angle of approximately 60°. The axis of rotation of the swing jig is then offset relative to the axis of rotation A of the spot drilling insert 10. As best shown in FIG. 8, the offset is taken so that the cutting edges 30 are centered on the rotational axis A of the spotting drill insert but the conical land surface 32 is radially closer to the rotational axis A at its trailing edge 34. In the illustrated embodiment, the offset is approximately five ten thousandths of an inch (0.0005). The resulting conical land surface 32 is five ten-thousandths of an inch closer to the rotational axis A of the spotting drill insert where it meets flute surface F2 than it is at the cutting edge 30. This small conical/radial relief is sufficient to prevent excessive rubbing contact between the land surface 32 of the drill point 12 and the material being cut. In a typical pilot drilling operation for a subsequent micro-drilling operation, only a very small axial portion of the 0.125 inch total axial length of the drill point 12 will be used. At the chisel edge 36, the drill point has a diameter of approximately five thousandths of an inch (0.005). Thus, what appears to be a very small radial relief of five ten thousandths of an inch (0.0005) actually represents 10% of the drill point diameter at its tip.

The drill point geometry according to aspects of the present invention provides a small diameter, narrow point angle drill point 12 with cutting edges 30 strong enough for production runs. Experimentation has shown that the spot drilling insert according to the present invention operates best at rotational speed between 5,000 and 8,000 rpm. The feed rate for this style of insert is relatively low, between one-half and one inch per minute. However, since the spot drilling insert is used for shallow-depth spotting, this relatively slow feed rate does not significantly impede production rate.

While an exemplary embodiment of the present invention has been disclosed for purposes of description, it should not be deemed a limitation of the invention. Various modifications, adaptations and alternatives may occur to one skilled in the art without departing from the spirit and the scope of the present invention.

What is claimed is:

1. A spot drilling insert comprising:
   an insert body supporting a drill point for rotation in a cutting direction about a rotational axis, said drill point comprising:
   a chisel edge supported by the drill point, said chisel edge having diametrically opposite ends;
   a pair of linear cutting edges, each cutting edge extending from one end of the chisel edge and inclined at an angle relative to said rotational axis, said cutting edge formed at an intersection of a substantially planar first flute surface and a substantially conical land surface, said land surface having an axis of curvature offset relative to said rotational axis,
   wherein said chisel edge and cutting edges are centered on said rotational axis and each said land surface radially approaches said axis of rotation in a direction opposite said cutting direction.

2. The spot drilling insert of claim 1, wherein said cutting edges define an included angle of less than 80°.

3. The spot drilling insert of claim 1, wherein said cutting edges define an included angle of approximately 60°.

4. The spot drilling insert of claim 1, wherein said drill point defines a flute between said substantially planar first flute surface and a substantially planar second flute surface.

5. A spot drilling tool comprising:
   a drill holder having an axis defining shank with a forward end defining an insert receiving socket; and
   a spot drilling insert comprising:
   an insert body having a socket-mating portion complementary in configuration to said socket; and
   a drill point integrally extending from an end of said insert body axially opposed to said socket mating portion, said drill point including a pair of substantially linear cutting edges inclined rearwardly from a chisel edge at the extreme forward end of said insert, each said cutting edge defined by an intersection of a substantially planar flute surface and a substantially conical land surface,
   wherein when said insert is received in said socket, said socket mating portion mates with said socket to position said cutting edges and chisel edge forwardly of said socket at a pre-determined position centered on the axis of said shank.

6. The spot drilling tool of claim 5, wherein said substantially conical land surface has an axis of curvature that is offset from the axis of said shank.

7. The spot drilling tool of claim 5, wherein said cutting edges define an included angle of less than 80°.

8. The spot drilling tool of claim 5, wherein said cutting edges define an included angle of approximately 60°.

9. A spot drilling tool comprising:
   a drill holder having an axis defining shank with a forward end defining an insert receiving socket; and
   a spot drilling insert comprising:
   an insert body having a socket-mating portion complementary in configuration to said socket; and
   a drill point integrally extending from an end of said insert body axially opposed to said socket mating portion, said drill point including a pair of substantially linear cutting edges inclined rearwardly from a chisel edge at the extreme forward end of said insert, each said cutting edge defined by an intersection of a substantially planar flute surface and a substantially conical land surface, said drill point including two linear V-shaped flutes defined by said substantially planar flute surface and a second substantially planar flute surface meeting at a radius, said flutes being diagonally opposed and diametrically offset in a plane orthogonal to the drill point and separated by a tapered web which supports said chisel edge,
   wherein when said insert is received in said socket, said socket mating portion mates with said socket to position said cutting edges and chisel edge forwardly of said socket at a pre-determined position centered on the axis of said shank.

10. A spot drilling insert comprising:
    an insert body having a first end and a second end supporting a drill point for rotation in a cutting direction about a rotational axis, said drill point comprising:
    two diametrically opposed substantially conical land surfaces extending rearwardly and outwardly from a tip of said drill point, each said land surface having an axis of curvature offset relative to said rotational axis, each said land surface radially approaching said axis of rotation in a direction opposite said cutting direction;

two diametrically opposed flutes, each said flute comprising a substantially planar first flute surface intersecting one of said land surfaces to form a cutting edge, said flutes arranged to converge as they approach said tip and angularly overlap behind said tip.

11. The spot drilling insert of claim 10, wherein said linear troughs are not parallel to said cutting edges.

12. The spot drilling insert of claim 10, wherein said tip defines a chisel edge extending between said cutting edges.

13. The spot drilling insert of claim 10, wherein said tip has a diameter and the axis of curvature of said land surfaces is offset from said rotational axis a distance equal to approximately 10% of said diameter.

14. The spot drilling insert of claim 10, wherein said cutting edges form an included angle of approximately 60°.

15. A spot drilling insert comprising:

an insert body having a first end and a second end supporting a drill point for rotation in a cutting direction about a rotational axis, said drill point comprising:

two diametrically opposed substantially conical land surfaces extending rearwardly and outwardly from a tip of said drill point, each said land surface having an axis of curvature offset relative to said rotational axis, each said land surface radially approaching said axis of rotation in a direction opposite said cutting direction;

two diametrically opposed flutes, each said flute comprising a substantially planar first flute surface intersecting one of said land surfaces to form a cutting edge, said linear troughs arranged to converge as they approach said tip and angularly overlap behind said tip, wherein each said flute comprises a substantially planar second flute surface meeting said substantially planar first flute surface at a radius to form an obtuse angle.

16. The spot drilling insert of claim 15, wherein said first flute surfaces are not parallel to a center plane of said insert body and said radius in each flute extends along a line formed at the meeting of said first and second flute surfaces and said lines are not parallel to said cutting edges.

* * * * *